United States Patent
Slater et al.

(10) Patent No.: US 6,853,877 B1
(45) Date of Patent: Feb. 8, 2005

(54) METHOD AND APPARATUS FOR MOBILE ROBOT MOTION CONTROL

(75) Inventors: James C. Slater, Mt. View, CA (US); Robert Holmberg, Mt. View, CA (US); Richard M. Legrand, Palo Alto, CA (US)

(73) Assignee: Nomadic Technologies, Mountain View, CA (US)

( * ) Notice: Subject to any disclaimer, the term of this patent is extended or adjusted under 35 U.S.C. 154(b) by 0 days.

(21) Appl. No.: 09/263,163

(22) Filed: Mar. 5, 1999

Related U.S. Application Data (63) Continuation-in-part of application No. PCT/US97/15605, filed on Sep. 5, 1997.
(60) Provisional application No. 60/025,406, filed on Sep. 6, 1996.

(51) Int. Cl.[7] .......................... G06F 19/00; B62D 11/00
(52) U.S. Cl. ........................ 700/245; 701/41; 180/6.2
(58) Field of Search .............................. 700/245, 256, 700/260–261; 701/41–42, 48, 51–54, 62, 69–75, 78–82, 84–92; 180/119, 170–172, 197, 200, 6.2, 6.24, 6.48, 6.6, 9.34, 9.38, 11–13, 14.7, 19.1–19.3, 21–23, 24.03, 24.07–24.08, 210–213, 218–224, 37, 252–253

(56) References Cited

U.S. PATENT DOCUMENTS

| | | | |
|---|---|---|---|
| 4,484,294 A | 11/1984 | Noss | |
| 4,594,671 A | 6/1986 | Sugimoto et al. | |
| 4,657,104 A | 4/1987 | Holland | |
| 4,882,528 A | 11/1989 | Sogabe et al. | |
| 4,925,312 A | 5/1990 | Onaga et al. | |
| 4,967,869 A | * 11/1990 | Nagaoka et al. | ............ 180/244 |
| 5,101,472 A | 3/1992 | Repperger | |
| 5,374,879 A | 12/1994 | Pin et al. | |
| 5,426,722 A | 6/1995 | Batchelder | |
| 5,559,696 A | 9/1996 | Borenstein | |
| 5,568,030 A | 10/1996 | Nishikawa et al. | |
| 5,576,947 A | 11/1996 | Wienkop | |
| 5,719,762 A | 2/1998 | Kanayama | |
| 5,739,657 A | 4/1998 | Takayama et al. | |
| 5,764,014 A | 6/1998 | Jakeway et al. | |
| 5,767,648 A | 6/1998 | Morel et al. | |
| 5,794,166 A | 8/1998 | Bauer et al. | |
| 5,796,927 A | 8/1998 | Hegg | |
| 5,924,512 A | 7/1999 | Wada | |

OTHER PUBLICATIONS

Rui et al, "Stabilization and Asymptotic Path Tracking of a Rolling Disk", Proceedings of the 34th Conference on Decision & Control, pp. 4294–4299, Dec. 1995.*

Everett, H.R., *Sensors for Mobile Robots; Theory and Application*, Jun., 1995, A.K. Peters Ltd. Publishing, pp. 56–59.

Wada, Masayoshi et al., *Omnidirectional Holonomic Mobile Robot Using Nonholonomic Wheels*, IEEE, 1995, pp. 446–453.

Wada, Masayoshi & Mori, Shunji, *Holonomic and Omnidirectional Vehicle with Conventional Tires*, IEEE International Conference on Robotics and Automation, 1996, pp. 3671–3676.

(List continued on next page.)

*Primary Examiner*—Thu V. Nguyen (57) ABSTRACT

A mobile base movable relative to a surface is disclosed. The base includes a main housing having at least two wheels pivotably and rotatably mounted to the housing with each wheel having a steering axis and a rotation axis. The steering and rotation axes are nonintersecting and are offset by a known caster distance. Further, included are drive means for rotating the wheels to roll along the surface, steering means for pivoting the wheels and changing their heading with respect to the surface, and controller means for reading an input vector from a host processor. The input vector is a three dimensional force torque vector.

4 Claims, 5 Drawing Sheets

OTHER PUBLICATIONS

Feng, L. et al., *Where am I? Sensors and Methods for Autonomous Mobile Robot Positioning*, University of Michigan, 1994, pp. 20–22.

Everett, H.R., *Sensors for Mobile Robots; Theory and Application*, pp. 56–59.

Muir, Patrick F. & Neuman, Charles P., *Kinematic Modeling of Wheeled Mobile Robots*, Carnegie–Mellon University, 1986, pp. 1–126.

Ferriere, L. et al., *Design of a Mobile Robot Equipped With Off–Centered Orientable Wheels*, Dept. of Mechanical Engineering, Belgium, p. 127–136.

Campion, Guy et al., *Structural Properties and Classification of Kinematic and Dynamic Models of Wheeled Mobile Robots*, IEEE Transactions on Robotics & Automation, vol. 12, No. 1, 1996, pp. 47–61.

Khatib, Oussama, *Inertial Properties In Robotic Manipulation*, Dept. of Computer Sci., Stanford University, 1992, pp. 1–34.

The Nomad 200: Merging Mind and Motion, product brochure, Nomadic Technologies, Inc., Apr., 1996, 2 pages.

The Nomad 150: Preliminary Specifications, product brochure, Nomadic Technologies, Inc., Apr., 1996, 2 pages.

Nomadic Control System: Multi–Processor Control System, product brochure, Nomadic Technologies, Inc., Apr., 1996, 1 page.

* cited by examiner

METHOD AND APPARATUS FOR MOBILE ROBOT MOTION CONTROL

This is a continuation-in-part of international application number PCT/US97/15605, filed on Sep. 5, 1997, which claims a priority of U.S. provisional application Ser. No. 60/025,406, filed on Sep. 6, 1996.

FIELD OF THE INVENTION

The present invention relates generally to manned or unmanned omni-directional, normal-wheeled vehicles. More precisely, this invention involves a method and apparatus for controlling the motion of mobile base used as a vehicle.

BACKGROUND OF THE INVENTION

Mobile bases with intended applications in robotics and industrial automation require a great deal of movement flexibility in order to be fully utilized. Current robot mobile bases often employ a "synchro-drive" mechanism—a complex set of gears and pulleys that constrains the wheels to steer and to translate simultaneously. Since steering and translation movement is fully decoupled in this system, "steering in place" is possible. (Contrast this maneuverability with that of a car.) While this allows a good deal of maneuverability, its mechanical complexity makes it difficult and expensive to manufacture. Additionally, this type of mobile base has limited movement due to its fixed orientation (i.e. its inability to rotate).

In general, a rigid body constrained to move in a plane (i.e. a mobile base moving on the floor) has three degrees of freedom (DOFs) such as, movement in the x direction, movement in the y direction and rotation. Combining these three DOFs results in movement in any direction while simultaneously rotating.

A holonomic mobile base, has the ability move in this manner and change its motion at any time. By constructing a mobile base out of wheels that each have two degrees of freedom (one for steering, one for translation) all three DOFs are possible under the proper control, and complex mechanisms found in synchro-drive mobile bases are no longer needed. Additionally, these 2-DOF wheels (2-DOFWs) can be easily integrated and manufactured as modular wheel assemblies. A complete description of one example of a robot base and modular wheel assembly is provided by U.S. patent application Ser. No. 09/134,241, by Holmberg et al., incorporated herein by reference.

It is also possible to increase the "caster" of a 2-DOFW by moving the translation axis behind the steering axis (FIG. 1) and making it resemble a caster wheel. Unlike a 2-DOFW wheel with no caster (i.e. intersecting steering and translation axes), a mobile base constructed with caster 2-DOFWs is fully holonomic under the proper control.

Various problems arise, however, when trying to control a mobile base constrained to three DOFs with more than three controllable DOFs (e.g. a base with four 2-DOFWs has eight DOFs). A base with this many DOFs under improper control will certainly result in undesired motion and motor axes that "fight" each other. (i.e. consider two wheels facing opposite directions playing tug-of-war.)

This in turn creates wheel slippage, increased tire wear, increased power consumption, and more frequent mechanical problems.

It is considered important in robotics to be able to accurately assess the motion of the mobile base either through direct measurement or through estimation. This motion estimation can also be "summed-up" over time to create a "dead reckoned" position estimate of the mobile base with respect to fixed coordinates, which is also useful for autonomous tasks such as navigation. That is, consider a robot that wishes to navigate to a location (room) of which it knows the x–y coordinates. Motion estimation is also responsible for proper control of the mobile base, as will be described below. A control algorithm which minimizes wheel slippage will also allow for maximum motion estimation accuracy.

SUMMARY OF THE INVENTION

Figure 3:
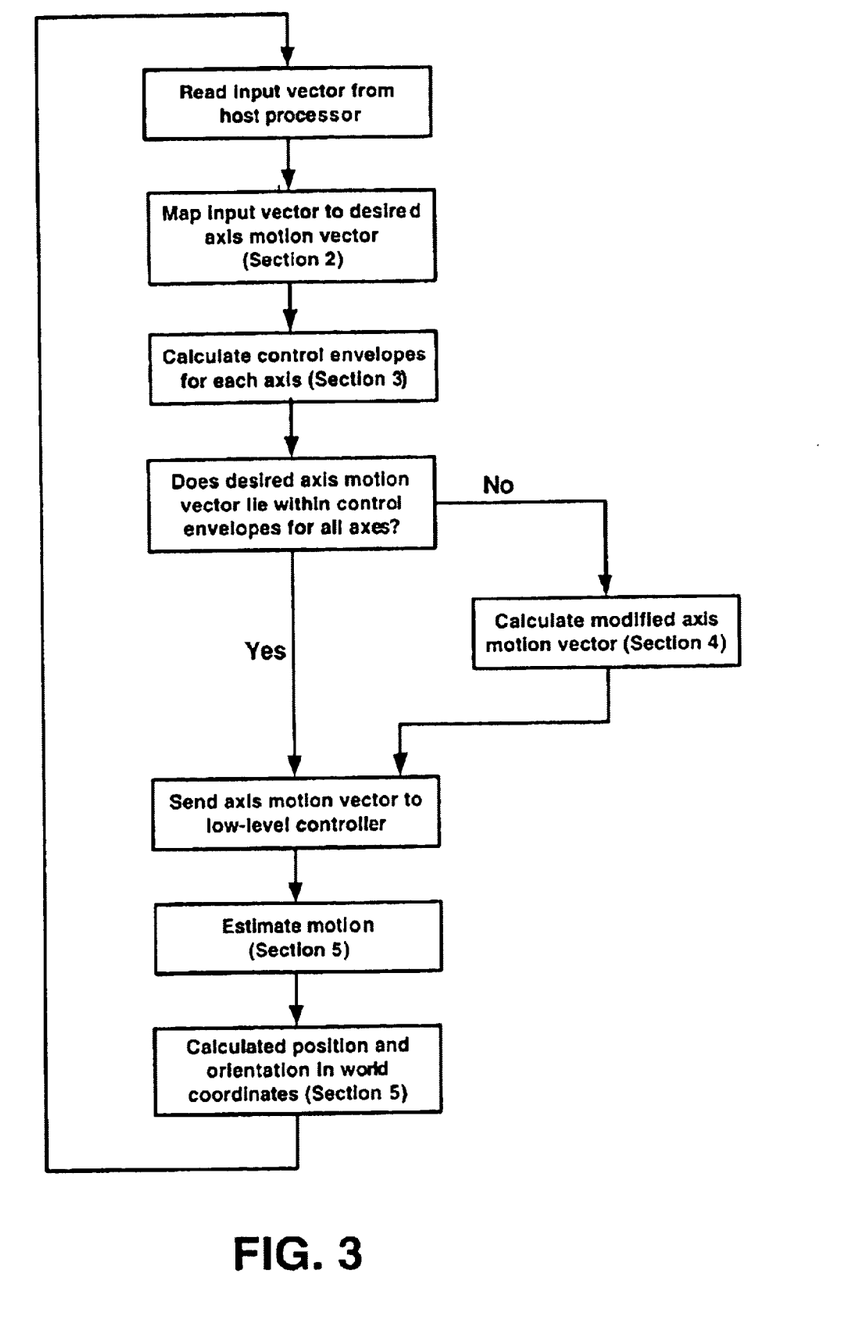
FIG. 3 is a schematic diagram showing the steps of a method for controlling the motion of the mobile base.

The present invention overcomes the deficiencies in the prior art described above, and provides motion control for a mobile robot base that is more accurate and more maneuverable Referring to FIG. 3 and the Detailed Description of the Preferred Embodiments, an overview of the inventive control sequence is provided in the following paragraph.

A supervisory controller reads the input vector from a host processor, and maps the input vector to the desired axis motion vector (i.e. the desired motion of each axis) by using the equations in Section 2 below. It then predicts if the axes are capable of the desired motion by calculating their control envelopes (i.e. the motion possible within one control cycle $\Delta t$.) as described in Section 3. If all axes are capable of the desired motion within one control cycle the desired axis motion vector is passed to the low-level controller. If one or more axes are incapable of the desired motion, a modified axis motion vector is calculated as described in Section 4 and passed to the low-level controller. The modified axis motion vector lies within the control envelopes of all 2N axes while minimizing control error (i.e. the difference between the commanded input vector and the actual base motion.) The control algorithm then estimates the motion of the mobile base since the last control cycle using the technique described in Section 5. The estimated motion is then used to update the position and orientation $[x_B, y_B, \psi_B]^T$ of the base coordinate frame in the fixed world coordinate frame as described also in Section 5. The updated position and orientation is then made available for the host processor to read. The control algorithm then repeats the whole process by beginning another control cycle.

DETAILED DESCRIPTION OF THE PREFERRED EMBODIMENTS

Section 1—Overview of the Control Algorithm

Referring to Table 1, a description of notations and variables used herein is provided.

TABLE 1

| | |
|---|---|
| N | Number of wheels |
| $[x_{Wi}, y_{Wi}]^T$ | Cartesian position of wheel attachment point of 2-DOFW i to the base in base coordinates (m, m) |
| $[x'_{Wi}, y'_{Wi}]^T$ | Cartesian position of wheel attachment point of 2-DOFW i to the base in base coordinates as it has changed since the previous control cycle using the coordinates of the previous control cycle (m, m) |
| $\theta_{mWi}$ | Measured steer angle of 2-DOFW i (rad) |
| $\theta_{dWi}$ | Desired steer angle of 2-DOFW i (rad) |
| $\bar{m}_d$ | Input vector (IV), or desired mobile base motion in base coordinates read from host processor (m/s, m/s, rad/s), (m/s$^2$, m/s$^2$, rad/s$^2$), or (N, N, Nm) dependant on desired implementation |
| $\bar{m}_x = [\dot{x}, \dot{y}, \dot{\psi}]^T$ | Actual mobile base motion in base coordinates (m/s, m/s, rad/s) |
| $\bar{m}_e = [\dot{x}_e, \dot{y}_e, \dot{\psi}_e]^T$ | Estimated mobile base motion in base coordinates calculated as described in Section 5 (m/s, m/s, rad/s) |
| $\Delta \bar{m}_e = [\Delta x_e, \Delta y_e, \Delta \psi_e]^T$ | Estimated change in mobile base position in base coordinates calculated as described in Section 5 (m, m, rad) |
| $\bar{m}_l(\lambda)$ | Possible mobile base motion decomposed along parametric line with parameter $\lambda$ (m/s, m/s, rad/s) (Section 4) |
| $\bar{m}_m$ | Modified mobile base motion (m/s, m/s, rad/s) |
| $\bar{m}_a$ | Axis motion vector (AMV) of length 2N. (Type of wheel (caster or no caster) and type of low level controller determines units) |
| $\delta$ | Small increment much less than 1.0 (0.1 nominal) (Section 4) |
| $[\dot{x}_{dWi}, \dot{y}_{dWi}]^T$ | Desired velocity vector of attachment point of 2-DOFW i to the base in base coordinates (m/s, m/s) |
| $\dot{\mu}_{dWi}$ | Desired velocity magnitude of 2-DOFW i (m/s) |
| $s_{dWi}$ | Desired steering axis position for 2-DOFW i (encoders) |
| $s_{mWi}$ | Measured steering axis position for 2-DOFW i (encoders) |
| $\grave{s}_{mWi}$ | Measured steering axis position for 2-DOFW i in the previous control cycle (encoders) |
| $\Delta s_{mWi}$ | Measured change in steering axis position for 2-DOFW i since the previous control cycle (m) |
| $\dot{s}_{dWi}$ | Desired steering axis velocity for 2-DOFW i (encoders/s) |
| $\dot{s}_{mWi}$ | Measured steering axis velocity for 2-DOFW i (encoders/s) |
| $\dot{s}_{maxWi}$ | Maximum steering axis velocity for 2-DOFW i (encoders/s) |
| $\ddot{s}_{maxWi}$ | Maximum steering axis acceleration for 2-DOFW i (encoders/s$^2$) |
| $s_{lWi}$ | Lower-bound steering axis position for 2-DOFW i within $\Delta t$ time (encoders) |
| $s_{uWi}$ | Upper-bound steering axis position for 2-DOFW i within $\Delta t$ time (encoders) |
| $\dot{s}_{lWi}$ | Lower-bound steering axis velocity for 2-DOFW i within $\Delta t$ time (encoders/s) |
| $\dot{s}_{uWi}$ | Upper-bound steering axis velocity for 2-DOFW i within $\Delta t$ time (encoders/s) |
| $t_{mWi}$ | Measured translation axis position for 2-DOFW i (encoders) |
| $\grave{t}_{mWi}$ | Measured translation axis position for 2-DOFW i in the previous control cycle (encoders) |
| $\Delta t_{mWi}$ | Measured change in translation axis position for 2-DOFW i since the previous control cycle (m) |
| $\dot{t}_{dWi}$ | Desired translation axis velocity for 2-DOFW i (encoders/s) |
| $\dot{t}_{mWi}$ | Measured translation axis velocity for 2-DOFW i (encoders/s) |
| $\dot{t}_{maxWi}$ | Maximum translation axis velocity for 2-DOFW i (encoders/s) |
| $\ddot{t}_{maxWi}$ | Maximum translation axis acceleration for 2-DOFW i (encoders/s$^2$) |
| $\dot{t}_{lWi}$ | Lower-bound translation axis velocity for 2-DOFW i within $\Delta t$ time (encoders/s) |
| $\dot{t}_{uWi}$ | Upper-bound translation axis velocity for 2-DOFW i within $\Delta t$ time (encoders/s) |
| $r_{Wi}$ | Radius of 2-DOFW i (m) |
| $\sigma_{Wi}$ | Steering axis encoder pitch for 2-DOFW i (encoders/rad) |
| $\tau_{Wi}$ | Translation axis encoder pitch for 2-DOFW i (encoders/rad) |
| $c_{Wi}$ | Amount of caster for 2-DOFW i (m) |
| $\Delta t$ | Time elapsed during a control cycle (s) |
| $[x_{eB}, y_{eB}, \psi_{eB}]^T$ | Estimated position and orientation of the base coordinate frame (i.e. coordinates that are fixed with respect to the mobile base and move with the mobile base) in fixed world coordinates (i.e. coordinates that are fixed with respect to the floor on which the mobile base moves) (m, m, rad) |
| C | Constraint matrix which maps mobile base motion to axis speeds [2N × 3] |
| $C_f^\#$ | The Force Projection Matrix which is the particular generalized inverse of the C matrix which is used to map the desired motion vector to the actuator control torques [3 × 2N] |
| $C_x^\#$ | The Velocity Estimation Matrix which is the particular generalized inverse of the C matrix which is used to map actuator speeds to base speeds [3 × 2N] |
| $\Lambda$ | The base mass matrix [3 × 3] |
| $\mu$ | The base centripetal, coriolis, and gravity vector [3 × 1] |
| $\gamma_{dWi}$ | Desired steering axis torque for 2-DOFW i (N · m) |
| $\gamma_{lWi}$ | Lower-bound steering axis torque for 2-DOFW i (N · m) |
| $\gamma_{uWi}$ | Upper-bound steering axis torque for 2-DOFW i (N · m) |
| $\rho_{dWi}$ | Desired translation axis torque for 2-DOFW i (N · m) |
| $\rho_{lWi}$ | Lower-bound translation axis torque for 2-DOFW i (N · m) |
| $\rho_{uWi}$ | Upper-bound translation axis torque for 2-DOFW i (N · m) |

Figure 1A:
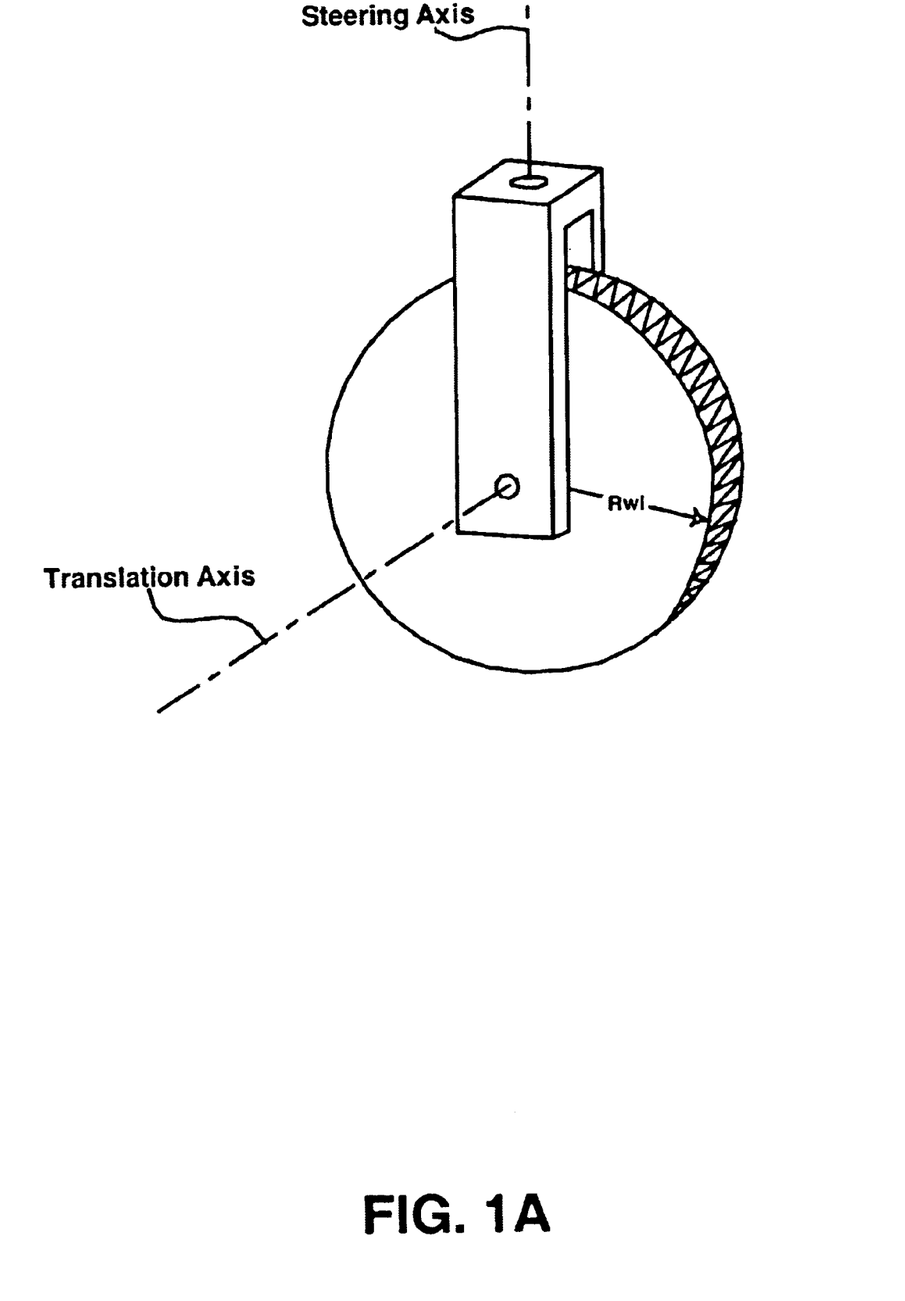
FIG. 1A is a perspective view showing a mobile base wheel with no caster offset.
Figure 1B:
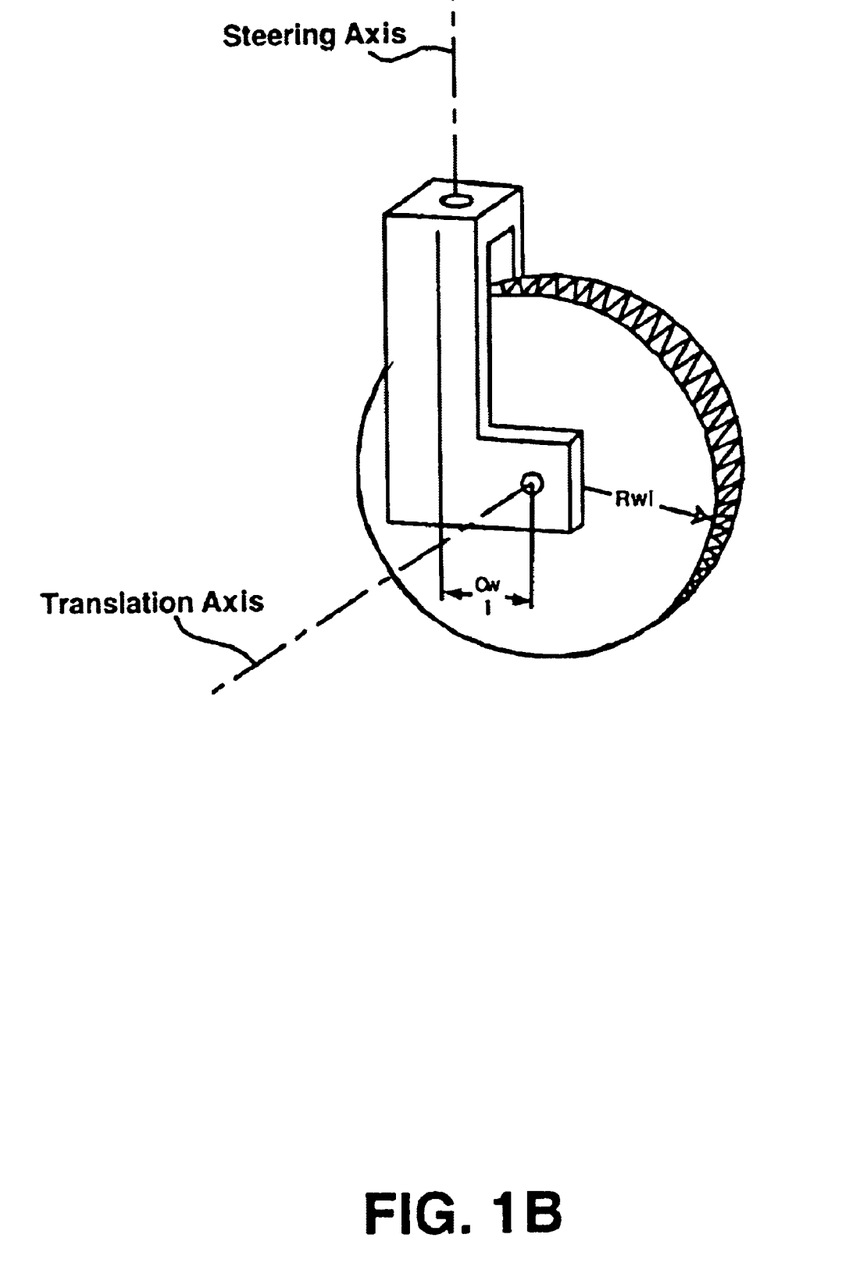
FIG. 1B is a perspective view showing a mobile base wheel with a caster offset.

Referring to FIGS. 1A and 1B, a mobile base constructed according to the present invention includes as many two degrees of freedom wheels (2-DOFWs) as deemed necessary (N≧2, where N is the number of 2-DOFWs). All of the wheels are mounted on the mobile base which is a rigid platform (depicted in FIG. 4.). Each 2-DOFW has two independent axes, one for steering and one for translation. FIG. 1A shows an example of a 2-DOFW with no caster, i.e. $c_{Wi}$ =0, such that the steering and translation axes intersect. FIG. 1B shows an example of a 2-DOFW having a caster offset, i.e. $c_{Wi}$ ≠0. In other words, the steering axis is offset from the translation axis by $c_{Wi}$. Each of the 2-DOFWs on the mobile base can have a different amount of caster if necessary.

Figure 2:
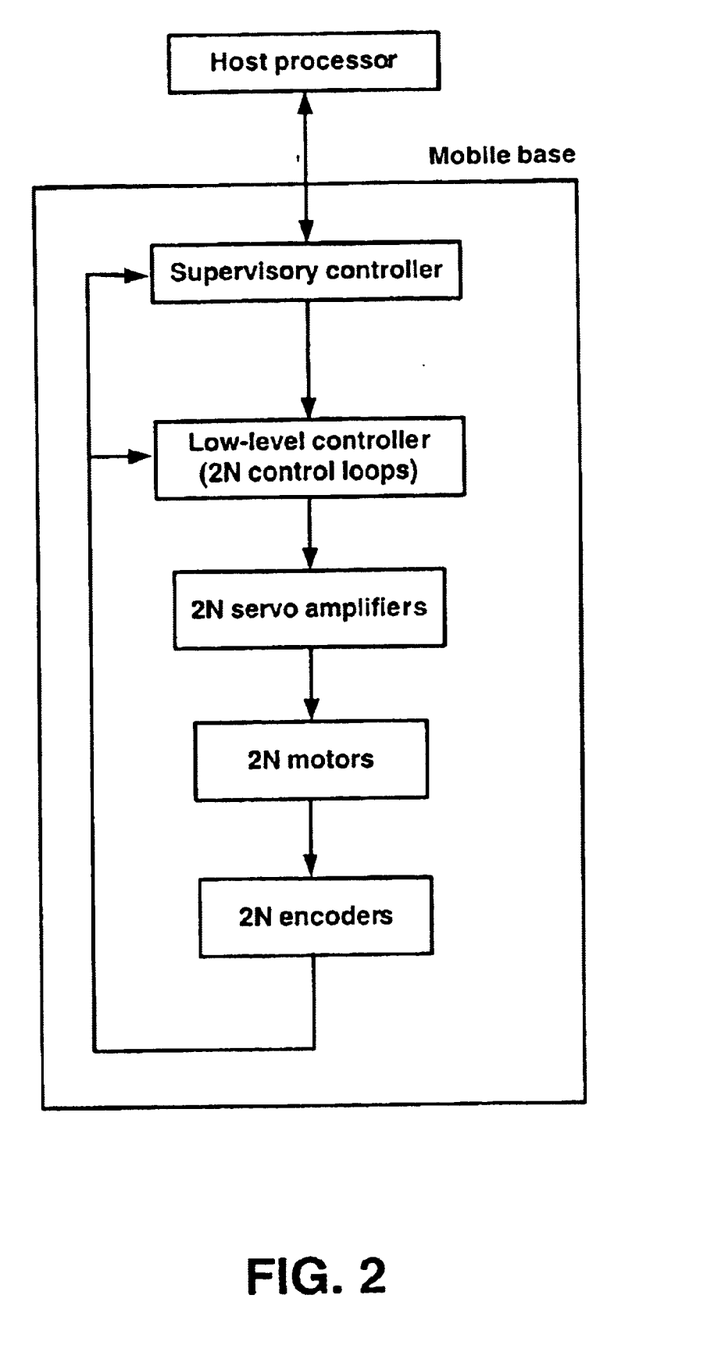
FIG. 2 is a schematic diagram showing the flow of command information which controls the motion of the mobile base.

Referring to FIG. 2, a schematic diagram shows the flow of command information which controls the motion of the mobile base. Since each of the N wheels has two axes (i.e. steering and translation), the mobile base has a total of 2N axes. Controlling the 2N axes of the mobile base are 2N servo amplifiers connected to a set of low-level controllers that perform closed-loop, high servo-rate control of all axis positions. Positional feedback of each axis is provided by an accurate encoding scheme. A supervisory controller interfaced to the low-level controllers coordinates all 2N axes by sending position updates to the low-level controllers at each discrete control cycle. The position updates are calculated by the control algorithm which takes into account the mobile base geometry, motor dynamics, and a 3-DOF input vector sent from a host processor interfaced to the supervisory controller. The 3-DOF input vector completely describes the desired velocity-based motion of the mobile base, which is constrained to move within three DOFs as described previously. A possible input vector, for example, consists of an x-velocity, y-velocity, and rotational velocity with respect to the center of the mobile base, or alternatively, angle, magnitude, and rotational velocity with respect to a random fixed point (i.e. the representation is arbitrary as long as the axes of the input vector are independent.)

The control algorithm is optimal in that it controls the 2N axes such that the mobile base moves as commanded by the input vector as accurately and as quickly as possible within the physical limits of the motors.

For example, if a motor is commanded beyond what it is physically capable of (i.e. it is commanded beyond its "saturation point") while other motors are commanded to within their physical limits, wheel slippage occurs. The control algorithm is able to predict this situation and correct it before it occurs. It accomplishes this by anticipating velocity or torque and saturation points with working models of each motor axis. Thus, the control algorithm simultaneously minimizes wheel slippage and minimizes the difference between desired motion specified by the input vector and actual mobile base motion (motion error).

Section 2—Mapping the Input Vector to the Desired Axis Motion Vector

Figure 4:
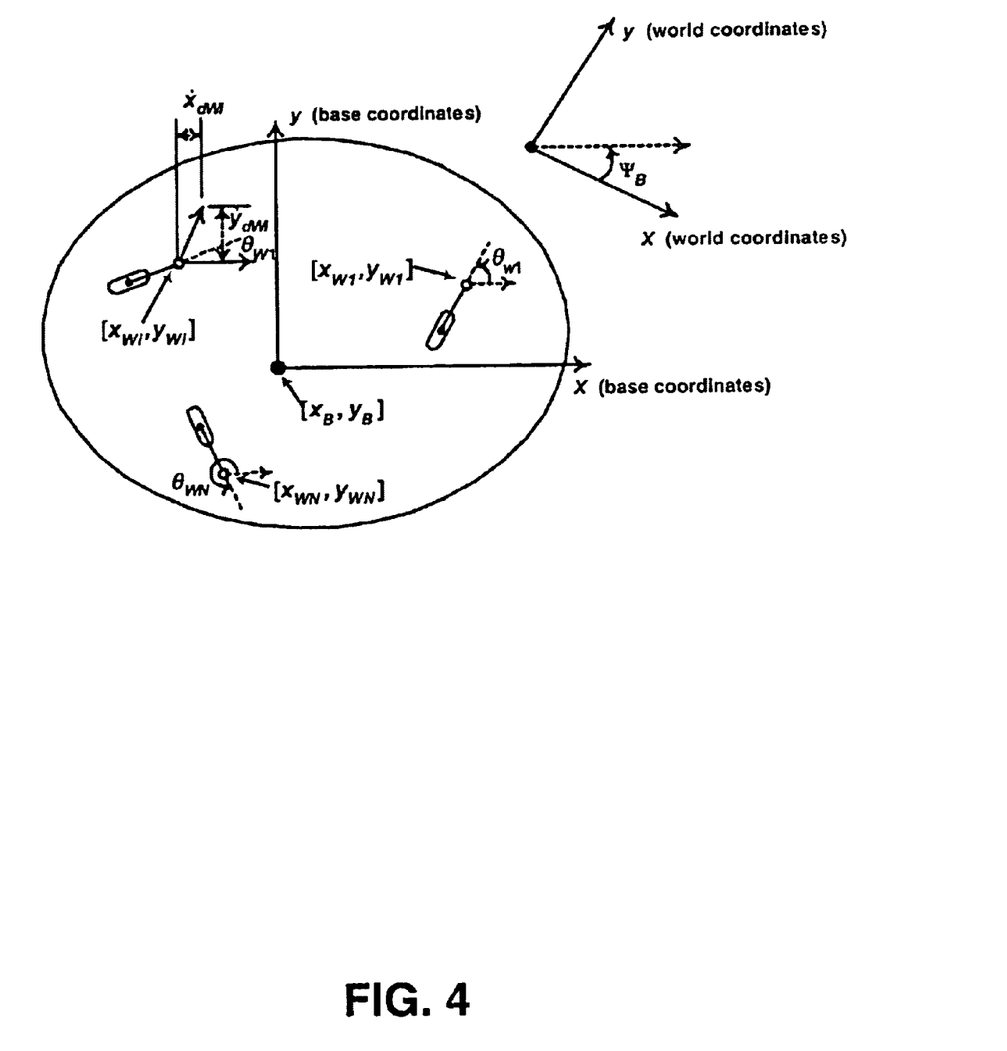
FIG. 4 is a perspective view schematically showing the layout of the mobile base wheels and the base and world coordinate systems.

This determines the axis motion vector (AMV), $\vec{m}_a$, which is the motion required at each 2-DOFW and the corresponding motion at each axis such that the mobile base moves according to the commanded input vector (i.e. $[\dot{x}_d, \dot{y}_d, \dot{\psi}_d]^T$). Thus, the mapping is from $\Re^3$ to $\Re^{2N}$. It is accomplished by first calculating the desired velocity to each wheel attachment point as below. The desired wheel velocity for each wheel is expressed as a 2-vector $[\dot{x}_{dWi}, \dot{y}_{dWi}]^T$ in base coordinates (FIG. 4). ($\forall i: 1 \leq i \leq N$)(i.e. for all wheels i):

$$\dot{x}_{dWi} = \dot{x}_d - y_{Wi}\dot{\psi}_d$$

$$\dot{y}_{dWi} = \dot{y}_d + x_{Wi}\dot{\psi}_d$$

where the $[x_{Wi}, y_{Wi}]^T$ are the Cartesian coordinates of the wheel attachment point of each 2-DOF i to the base in base coordinates (m, m).

The steering angle ($\theta_{mWi}$) for each 2-DOFW is measured based on the raw measured encoder value of the steering axis ($s_{mWi}$) and the encoder pitch ($\sigma_{Wi}$):

$$\theta_{mWi} = \frac{s_{mWi}}{\sigma_{Wi}}$$

and will be used in many of the following calculations.

These desired wheel velocities are then mapped to the two axes of the 2-DOFW. For 2-DOFWs with no caster ($c_{Wi}=0$) the desired steering axis position and desired translation axis velocity $[s_{dWi}, \dot{t}_{dWi}]$ are calculated for each 2-DOFW as follows:

$$\theta_{dWi} = \arctan 2(\dot{y}_{dWi}, \dot{x}_{dWi})$$

$$\dot{\mu}_{dWi} = \sqrt{\dot{x}_{dWi}^2 + \dot{y}_{dWi}^2}$$

$$s_{dWi} = \sigma_{Wi}\theta_{dWi}$$

$$\dot{t}_{dWi} = \frac{\tau_{Wi}}{r_{Wi}}\dot{\mu}_{dWi}$$

with $$\vec{m}_a = [s_{dW1}, \dot{t}_{dW1}, \ldots, s_{dWi}, \dot{t}_{dWi}, \ldots, s_{dWN}, \dot{t}_{dWN}]^T$$

where $\theta_{dWi}$ is the desired steering angle for 2-DOFW i,
$\sigma_{Wi}$ is the steering axis "encoder pitch" for 2-DOFW i expressed in encoders per radian, and
$\dot{\mu}_{dWi}$ is the desired velocity magnitude for wheel i When using a velocity based low level controller for 2-DOFWs with caster ($c_{Wi} \neq 0$) the desired steering axis velocity and desired translation axis velocity $[\dot{s}_{dWi}, \dot{t}_{dWi}]$ are calculated for each 2-DOFW as below.

$$\dot{s}_{dWi} = \frac{\sigma_{Wi}}{c_{Wi}}(\dot{y}_{dWi}\cos(\theta_{mWi}) - \dot{x}_{dWi}\sin(\theta_{mWi})) - \dot{\psi}$$

$$\dot{t}_{dWi} = \frac{\tau_{Wi}}{r_{Wi}}(\dot{x}_{dWi}\cos(\theta_{mWi}) + \dot{y}_{dWi}\sin(\theta_{mWi}))$$

with $$\vec{m}_a = [\dot{s}_{dW1}, \dot{t}_{dW1}, \ldots, \dot{s}_{dWi}, \dot{t}_{dWi}, \ldots, \dot{s}_{dWN}, \dot{t}_{dWN}]^T$$

where $c_{Wi}$ is the amount of caster offset in meters,
$\tau_{Wi}$ is the encoder pitch for 2DOFW i expressed in encoders per radians, and
$\gamma_{Wi}$ is the radius of the 2DOFW i When using a torque based low level controller for 2-DOFWs with caster ($c_{Wi} \neq 0$) the desired steering axis torque and desired translation axis torque $[\gamma_{dWi}, \rho_{dWi}]^T$ are calculated for each 2-DOFW as below. First, gather coefficients of the base velocities from the previous equations used in the development of the velocity controller into the constraint matrix, C. The constraint matrix is defined by the ideal kinematic relationship:

$$\vec{m}_a = C\vec{m}_x$$

where $\vec{m}_a$ is the motion axis vector and $\vec{m}_x$ is the actual mobile base motion. The constraint matrix for the preferred embodiment is:

$$C = \begin{bmatrix} -\frac{\sigma_{WI}}{c_{WI}}\sin(\theta_{mWI}) & \frac{\sigma_{WI}}{c_{WI}}\cos(\theta_{mWI}) & \frac{\sigma_{WI}}{c_{WI}}(x_{WI}\cos(\theta_{mWI}) + y_{WI}\sin(\theta_{mWI})) - 1 \\ \frac{\tau_{WI}}{r_{WI}}\cos(\theta_{mWI}) & \frac{\tau_{WI}}{r_{WI}}\sin(\theta_{mWI}) & \frac{\tau_{WI}}{r_{WI}}(x_{WI}\sin(\theta_{mWI}) - y_{WI}\cos(\theta_{WI})) \\ \vdots & \vdots & \vdots \\ -\frac{\sigma_{WI}}{c_{Wi}}\sin(\theta_{mWi}) & \frac{\sigma_{WI}}{c_{Wi}}\cos(\theta_{mWi}) & \frac{\sigma_{WI}}{c_{Wi}}(x_{Wi}\cos(\theta_{mWi}) + y_{Wi}\sin(\theta_{mWi})) - 1 \\ \frac{\tau_{WI}}{r_{Wi}}\cos(\theta_{mWi}) & \frac{\tau_{WI}}{r_{Wi}}\sin(\theta_{mWi}) & \frac{\tau_{WI}}{r_{Wi}}(x_{Wi}\sin(\theta_{mWi}) - y_{Wi}\cos(\theta_{mWi})) \\ \vdots & \vdots & \vdots \\ -\frac{\sigma_{WI}}{c_{WN}}\sin(\theta_{mWN}) & \frac{\sigma_{WI}}{c_{WN}}\cos(\theta_{mWN}) & \frac{\sigma_{WI}}{c_{Wi}}(x_{WN}\cos(\theta_{mWN}) + y_{WN}\sin(\theta_{mWN})) - 1 \\ \frac{\tau_{WI}}{r_{WN}}\cos(\theta_{mWN}) & \frac{\tau_{WI}}{r_{WN}}\sin(\theta_{mWi}) & \frac{\tau_{WI}}{r_{WN}}(x_{WN}\sin(\theta_{mWN}) - y_{Wi}\cos(\theta_{mWN})) \end{bmatrix}$$

Calculate, $C_f^{\#}$, the force projection matrix, a generalized left inverse of C. Any generalized left inverse will work. By judicious choice of a particular $C_f^{\#}$ various behaviors can be implemented. An example which is particularly useful is:

$$C_f^{\#} = (C^T C)^{-1} C^T$$

which minimizes, in a least squares way, the axis torques. The axis motion vector containing the desired steering axis torque and desired translation axis torque $[\gamma_{dWi}, \rho_{dWi}]^T$ is then:

$$\vec{m}_a = C_f^{\#T} \vec{m}_d$$

where $\vec{m}_d$ is the 3-DOF force torque input vector. For control of a base with a known dynamic model, one can dynamically decouple the undesired forces by calculating the axis torques with the following expression:

$$\vec{m}_a = C_f^{\#T}(\Lambda \vec{m}_d + \mu)$$

where $\vec{m}_d$ is the 3 DOF acceleration input vector and $$\vec{m}_a = [\gamma_{dW1}, \rho_{dW1}, \ldots, \gamma_{dWi}, \rho_{dWi}, \ldots, \gamma_{dWN}, \rho_{dWN}]^T$$

are the axis torques.

When controlling the base in 3 DOF it is desirable to eliminate or greatly reduce the undesired motion of the vehicle due to the dynamic effects of the various motions of the 2-DOFWs. This can be accomplished by using $\Lambda$ and $\mu$ in the above equations as found from the dynamic model of the base. It is well understood by those skilled in the art that the dynamic model, that is defined by the dynamic equations of a system (base) can be found and written as:

$$F = \Lambda \ddot{x} + \mu$$

where F is the 3 DOF linear and rotational force on the base, $\Lambda$ is the mass matrix, $\ddot{x}$ is the acceleration of the base in 3DOF, and $\mu$ is the centripetal, coriolis, and gravity vector. It is possible to control a base with unknown dynamics by using an estimate of the dynamic parameters such as:

$$\Lambda = \begin{bmatrix} 1 & 0 & 0 \\ 0 & 1 & 0 \\ 0 & 0 & 1 \end{bmatrix}, \mu = \begin{bmatrix} 0 \\ 0 \\ 0 \end{bmatrix}$$

but the base will not produce the desired motion as closely as when the values of the dynamic parameters for the actual base are used.

Thus, by concatenating all N wheel motion pairs described above, we create a desired axis motion vector which is 2N in length.

Section 3—Calculating the Control Envelopes

The control envelope for an axis describes the possible motion an axis can perform within a fixed time. For a 2-DOFW i with no caster ($c_{Wi}=0$) we must calculate the steering axis position lower and upper bounds ($s_{lWi}$ and $s_{uWi}$) and the translation axis velocity lower and upper bounds ($\dot{t}_{lWi}$ and $\dot{t}_{uWi}$). First, calculating the steering position lower bound, we assume that the axis should move based on a value proportional to the error ($s_{dWi}-s_{mWi}$) scaled by gain value ($k_p$) minus a small tolerance ($e_s$) or based on the maximum (negative) acceleration possible for the steering axis ($\ddot{s}_{max\ Wi}$) (the measured position and velocity ($s_{mWi}$ and $\dot{s}_{mWi}$) are required to calculate the position as a result of maximum acceleration), whichever is greater:

$$s_{lWi} = \max(s_{mWi} + k_p(s_{dWi} - s_{mWi}) - e_s, s_{mWi} + \dot{s}_{mWi}\Delta t - \tfrac{1}{2}\ddot{s}_{max\ Wi}\Delta t^2)$$

Calculating the upper bound, we similarly assume the axis should move based on a value proportional to the error scaled by a gain value plus a small tolerance or based on the maximum (positive) acceleration, whichever is lesser.

$$s_{uWi} = \min(s_{mWi} + k_p(s_{dWi} - s_{mWi}) + e_s, s_{mWi} + \dot{s}_{mWi}\Delta t + \tfrac{1}{2}\ddot{s}_{max\ Wi}\Delta t^2)$$

Calculating the lower bound of the translation axis velocity, we assume the control envelope is determined by either maximum (negative) acceleration, or by the maximum possible (negative) velocity of the translation axis ($\dot{t}_{max\ Wi}$), whichever is greater.

$$\dot{t}_{lWi} = \max(\dot{t}_{mWi} - \ddot{t}_{max\ Wi}\Delta t, -\dot{t}_{max\ Wi})$$

Calculating the upper bound, we similarly assume the control envelope is determined by either the maximum (positive) acceleration, or by the maximum possible (positive) velocity of the translation axis, whichever is lesser.

$$\dot{t}_{uWi} = \min(\dot{t}_{mWi} + \ddot{t}_{max\ Wi}\Delta t, \dot{t}_{max\ Wi})$$

Once these values have been determined, the desired motion $[s_{dWi}, \dot{t}_{dWi}]$ lies within the control envelope for $\Delta t$ time duration if and only if $$s_{dWi} \geq s_{lWi} \text{ and } s_{dWi} \leq s_{mWi}$$

or $$s_{dWi} \leq s_{uWi} \text{ and } s_{dWi} \geq s_{mWi}$$

For a 2-DOFW i with caster ($c_{Wi} \neq 0$) when a velocity based low level controller is used, we must calculate the steering axis velocity lower and upper bounds ($\dot{s}_{lWi}$ and $\dot{s}_{uWi}$) and translation axis velocity lower and upper bounds ($\dot{t}_{lWi}$ and $\dot{t}_{uWi}$). Calculating the lower bound of the steering axis velocity, we assume the control envelope is determined by either maximum (negative) acceleration ($\ddot{s}_{max\ Wi}$), or by the maximum possible (negative) velocity of the translation axis ($\dot{s}_{max\ Wi}$), whichever is greater.

$$\dot{s}_{lWi} = \max(\dot{s}_{mWi} - \ddot{s}_{max\ Wi}\Delta t, -\dot{s}_{max\ Wi})$$

Calculating the upper bound, we similarly assume the control envelope is determined by either the maximum (positive) acceleration, or by the maximum possible (positive) velocity of the steering axis, whichever is lesser.

$$\dot{s}_{uWi} = \min(\dot{s}_{mWi} + \ddot{s}_{max\ Wi}\Delta t, \dot{s}_{max\ Wi})$$

Calculating the translation velocity lower and upper bounds is the same for 2-DOFWs with caster.

$$\dot{t}_{lWi} = \max(\dot{t}_{mWi} - \ddot{t}_{max\ Wi}\Delta t, -\dot{t}_{max\ Wi})$$

$$\dot{t}_{uWi} = \min(\dot{t}_{mWi} + \ddot{t}_{max\ Wi}\Delta t, \dot{t}_{max\ Wi})$$

Once these values have been determined, the desired motion [$\dot{s}_{dWi}, \dot{t}_{dWi}$] lies within the control envelope for $\Delta t$ time duration if and only if $$\dot{s}_{lWi} \leq \dot{s}_{dWi} \leq \dot{s}_{uWi}$$

and $$\dot{t}_{lWi} \leq \dot{t}_{dWi} \leq \dot{t}_{uWi}$$

For a 2-DOFW i with caster ($c_{Wi} \neq 0$), when a torque based low level controller is used, we must determine if the motion input vector ($\vec{m}_d$) is within the upper bound of the actuator torque ($\gamma_{uWi}, \rho_{uWi}$) and the lower bound of the actuator torque ($\gamma_{lWi}, \rho_{lWi}$):

$$\gamma_{lWi} \leq \gamma_{dWi} \leq \gamma_{uWi}$$

$$\rho_{lWi} \leq \rho_{dWi} \leq \rho_{uWi}$$

Thus we can determine for a given increment in time ($\Delta t$) the possible motion for each axis (control envelope) of each 2-DOFW, and for a given axis motion vector, whether it lies within the control envelopes.

Section 4—Calculating the Modified Axis Motion Vector

We describe an algorithm that can be applied when the desired axis motion vector mapped from the input vector does not lie within the control envelopes of all axes. Given a desired base motion input vector ($\vec{m}_d$) and a current estimated base motion vector ($\vec{m}_e$) (calculated in Section 5) we can determine a modified motion vector that is closest to the desired input vector while staying within the control envelopes of all axes.

When a velocity based low level controller is used, we begin by defining a parametric line $m_f(\lambda)$ as a function of $\lambda$, which varies between 0 and 1:

$$\vec{m}_f(\lambda) = \lambda(\vec{m}_d - \vec{m}_e) + \vec{m}_e$$

$$0 \leq \lambda \leq 1$$

Evaluating $m_f(0)$ results in me, which is the current base motion vector. Evaluating $m_f(1)$ results in $\vec{m}_d$, which is the desired input vector. Thus, we define an algorithm that finds a value of $\lambda$ whose $m_f(\lambda)$ mapping is closest to the desired input vector and lies within the control envelopes when mapped to the axis motion vector. The basic idea is to increment $\lambda$ by a small amount ($\delta$) until the mapping of $m_f(\lambda)$ to the axis motion vector lies within the control envelopes. This becomes the modified axis motion vector.

When a torque based low level controller is used, we again begin by defining a parametric line $m_f(\lambda)$ as a function of $\lambda$, which varies between 0 and 1, where now:

$$\vec{m}_f(\lambda) = \lambda \vec{m}_d$$

$$0 \leq \lambda \leq 1$$

Evaluating $m_f(0)$ results in zero torque command such that the base continues its current base motion vector. Evaluating $m_f(1)$ results in $\vec{m}_d$, which is the desired input vector. Thus, we define an algorithm that finds a value of $\lambda$ whose $m_f(\lambda)$ mapping is closest to the desired input vector and lies within the control envelopes when mapped to the axis motion vector. The basic idea is to increment $\lambda$ by a small amount ($\delta$) until the mapping of $m_f(\lambda)$ to the axis motion vector lies within the control envelopes. This becomes the modified axis motion vector.

Using: the appropriate equation for $m_f(\lambda)$ from above, and with $0 \leq \delta \ll 1$:

begin procedure $\lambda = \delta$ while $\vec{m}_f(\lambda)$ mapped to axis motion vector (Section 2) lies within control envelopes of all axes of each 2-DOFW (Section 3) do $\lambda = \lambda = \delta$ end $\vec{m}_m = \vec{m}_f(\lambda)$ return axis motion vector mapping of $\vec{m}_m$ end Note, there are many possible ways to implement the same algorithm. This method is presented because of its simplicity.

Section 5—Estimating the Motion of the Mobile Base

Here, we describe how to estimate the motion of the base during the discrete time interval $\Delta t$. First, we calculate the new apparent wheel positions with respect to the base coordinates. These new coordinates are expressed as $x_{Wi}'$ and $y_{Wi}'$ for wheel: i. For wheels with no caster ($c_{Wi} \neq 0$), we begin by calculating the measured steering angle as in Section 1:

$$\theta_{mWi} = \frac{s_{mWi}}{\sigma_{Wi}}$$

We proceed by calculating the measured translation distance ($\Delta t_{mWi}$) since the beginning of the previous control cycle:

$$\Delta t_{mWi} = (t_{mWi} - 't_{mWi})$$

Here, we introduce $'t_{mWi}$ which is the measured translation axis position at the beginning of the previous control cycle expressed in encoders. The apparent wheel positions are then simply the wheel positions in base coordinates ($x_{Wi}$ and $y_{Wi}$) plus the calculated motion:

$$x'_{Wi} = x_{Wi} + \Delta t_{mWi} \frac{r_{Wi}}{\tau_{Wi}} \cos(\theta_{mWi})$$

$$y'_{Wi} = y_{Wi} + \Delta t_{mWi} \frac{r_{Wi}}{\tau_{Wi}} \sin(\theta_{mWi})$$

For wheels with caster ($c_{Wi} \neq 0$), we similarly calculate the steering angle, $\theta_{mWi}$, and the apparent wheel motion as a result of the translation axis, $\Delta t_{mWi}$. However, because of the caster offset, steering motion results in apparent wheel motion as well. Here we introduce $'s_{mWi}$ which is the measured steering axis position at the beginning of the previous control cycle expressed in encoders:

$$\Delta s_{mWi} = (s_{mWi} - 's_{mWi})$$

The apparent wheel motion is then calculated by a rotation with respect to the steer angle:

$$x'_{Wi} = x_{Wi} + \Delta t_{mWi} \frac{r_{Wi}}{\tau_{Wi}} \cos(\theta_{mWi}) - \Delta s_{mWi} \frac{c_{Wi}}{\sigma_{Wi}} \sin(\theta_{mWi})$$

$$y'_{Wi} = y_{Wi} + \Delta s_{mWi} \frac{c_{Wi}}{\sigma_{Wi}} \sin(\theta_{mWi}) + \Delta t_{mWi} \frac{r_{Wi}}{\tau_{Wi}} \sin(\theta_{mWi})$$

We then use the apparent wheel motion to calculate the amount of base rotation $\Delta \psi_e$ since the last control cycle. We do this by calculating the rotation for each possible wheel pair and averaging the results:

$$M = C(N, 2)$$

$$\Delta \psi_e = \frac{1}{M} \sum_{\forall [j,k]} \arctan2(y'_{Wk} - y'_{Wj}, x'_{Wk} - x'_{Wj}) - \arctan2(y_{Wk} - y_{Wj}, x_{Wk} - x_{Wj})$$

The above equation is summed over all possible wheel pairs j, k. That is, there are C(N,2) (N choose 2 combinatorial) possible wheel combinations.

Since the position of a mobile base having only two wheels (i.e. N=2) can be estimated with feedback from only three of its four motion axes (the fourth one being redundant), there are many other ways to estimate the motion of the base. The preceding formula can be used for bases having only two wheels, but there will only be one wheel pair to "average." As the number of wheels used on a mobile base goes up (i.e. as N increases), the better the above estimation algorithm gets.

We now calculate the change in x and y coordinates ($\Delta x_e$ and $\Delta y_e$) by evaluating the following equations:

$$\Delta x_e = \frac{1}{N} \sum_{i=1}^{N} (x'_{Wi} + y_{Wi} \Delta \psi_e)$$

$$\Delta y_e = \frac{1}{N} \sum_{i=1}^{N} (y'_{Wi} - x_{Wi} \Delta \psi_e)$$

The estimated base motion vector can be calculated by dividing by the time increment $\Delta t$:

$$\vec{m}_e = 1/\Delta t \, [\Delta x_e, \Delta y_e, \Delta \psi_e]^T$$

A similar method to calculate mi, which directly averages the measured readings with a more compact notation, uses the matrix, C, introduced above:

$$\vec{m}_e = 1/\Delta t \, C_x^{\#} [\Delta s_{mW1}, \Delta t_{mWi}, \ldots, \Delta s_{mWi}, \Delta t_{mWi}, \ldots, \Delta s_{mWN}, \Delta t_{mWN}]^T$$

where $C_x^{\#}$, the velocity estimation matrix, is a generalized left inverse of C. Any generalized left inverse will work. By judicious choice of a particular $C_x^{\#}$ various behaviors can be implemented. An example which is particularly useful is:

$$C_x^{\#} = (C^T C)^{-1} C^T$$

which minimizes, in a least squares way, the difference in the measured motion of the axis sensors and the motion of axis sensors on an ideal model of the PCV which perfectly obeys the velocity relationship described by C.

The final step in motion estimation is determining the "summed-up" position of the mobile base in fixed world coordinates. This is accomplished by adding the rotation angle change $\Delta \psi_{eB}$ to the existing angle estimate($\psi_{eB}$). Similarly $X_{eB}$ and $y_{eB}$ are calculated by adding to the existing estimates the rotated change in x and y coordinates with respect to $\psi_{eB}$:

$$\psi_{eB} = \psi_{eB} + \Delta \psi_e$$

$$x_{eB} = x_{eB} + \Delta x_e \cos(\psi_{eB}) - \Delta y_e \sin(\psi_{eB})$$

$$y_{eB} = y_{eB} + \Delta y_e \cos(\psi_{eB}) - \Delta x_e \sin(\psi_{eB})$$

Section 6—Summary

The present invention, as described above, provides a method and apparatus for controlling the motion of a mobile base with increased accuracy and maneuverability. In its preferred embodiment, the present invention is used on a mobile robot base having three wheels each with a predetermined amount of caster. The mobile robot is controlled by an off-board host processor (as shown in FIG. 2.) The host processor sends command signals and receives motion feedback from an onboard supervisory controller by radio, cable, infrared, or similar type of link. The motion control signals are mapped to axis control signals by the supervisory controller and sent to six low-level controllers. Each of the six low level controllers corresponds to either a steering axis or translation axis for one of the three wheels. Each of the low level controllers in turn sends an axis control signal to an associated servo amplifier, which provides the proper voltage and current to drive the respective axis motor. Each of the six motors has an encoder, which provides motor position feedback to both the low-level controller and the supervisory controller.

The host processor and supervisory controller are preferably microprocessors that are commonly used for embedded control. Propriety software code is written preferably in C programming language to implement the inventive control method on the microprocessors and low level controllers.

The inventive method and apparatus can be utilized with other configurations (not shown), such as on drive systems for forklifts or automated guided vehicles (AGV's.) Also, the mobile base described above can be inverted with the positions of the mobile base and the surface it rolls on transposed. In other words, two degree of freedom wheels can be mounted pointed upward on a stationary base, and can translate and rotate a horizontal surface resting on the wheels. In another possible application (not shown), multiple bases, each having single or multiple wheels, can be pivotably linked together in a snake-fashion to form a non-rigid base which is controlled by the inventive method.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed is:

1. A mobile base movable relative to a surface, the base comprising:

a main housing;

at least two wheels pivotably and rotatably mounted to the housing, each wheel having a steering axis and a rotation axis with the steering and rotation axes non-intersecting and offset by a known caster distance;

drive means for rotating the wheels to roll along the surface;

steering means for pivoting the wheels and changing their heading with respect to the surface; and controller means for reading an input vector from a host processor, wherein the input vector is a three dimensional force torque vector, reading the steering axis headings, calculating a desired torque for each steering and rotation axis such that at any given time, the calculated resultant forces on the base reflect the input vector, regardless of the positions of the steering and rotation axes, and commanding the calculated torque to each steering and rotation axis, wherein the calculated torque of each steering and rotation axis is computed from the input vector and a generalized inverse of a constraint matrix, C, the constraint matrix being defined by the following kinematic relationship:

$$\vec{m}_a = C\vec{m}_x$$

where $\vec{m}_a$ represents a motion axis vector and $\vec{m}_x$ represents actual mobile base motion and wherein the generalized inverse of C is chosen such that a sum of squares of the axis torques is minimized.

2. An apparatus as described in claim 1 wherein the controller means includes a dynamic model such that the controller means compensates for undesired motion of the base due to various motions of the wheels.

3. An apparatus as described in claim 1 wherein the generalized inverse of C is chosen such that a sum of squares of wheel contact forces is minimized.

4. An apparatus as described in claim 1 wherein there is an instantaneous power for each of the steering and rotation axes and wherein the generalized inverse of C is chosen such that a sum of the instantaneous powers of all of the axes is minimized.

* * * * *